United States Patent
Yasui et al.

(10) Patent No.: US 9,523,908 B2
(45) Date of Patent: Dec. 20, 2016

(54) IMAGE PROJECTION APPARATUS AND IMAGE PROJECTION METHOD

(71) Applicant: Sony Corporation, Tokyo (JP)

(72) Inventors: Toshifumi Yasui, Kanagawa (JP); Mikinori Matsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 14/166,270

(22) Filed: Jan. 28, 2014

(65) Prior Publication Data
US 2014/0218702 A1 Aug. 7, 2014

(30) Foreign Application Priority Data
Feb. 6, 2013 (JP) ................... 2013-021705

(51) Int. Cl.
| G03B 21/14 | (2006.01) |
| G03B 21/28 | (2006.01) |
| G02B 17/08 | (2006.01) |
| G02B 26/08 | (2006.01) |

(52) U.S. Cl.
CPC ............ *G03B 21/28* (2013.01); *G02B 17/08* (2013.01); *G02B 17/0852* (2013.01); *G02B 26/0816* (2013.01); *G03B 21/142* (2013.01); *G03B 21/145* (2013.01)

(58) Field of Classification Search
CPC ..... G03B 21/14; G03B 21/145; G03B 21/142; G03B 21/28; G03B 21/2066
USPC .............................. 353/21, 39, 71, 119, 98, 99
See application file for complete search history.

(56) References Cited

U.S. PATENT DOCUMENTS

| 8,087,789 B2* | 1/2012 | Amano | G03B 21/28 353/99 |
| 8,702,247 B2* | 4/2014 | Amano | G03B 21/10 353/119 |
| 8,794,772 B2* | 8/2014 | Morikuni | G03B 21/28 353/119 |
| 2009/0066919 A1* | 3/2009 | Fujita | G03B 21/10 353/98 |
| 2011/0063580 A1* | 3/2011 | Amano | G02B 17/08 353/20 |
| 2011/0063586 A1* | 3/2011 | Amano | H04N 9/3197 353/99 |
| 2012/0032875 A1* | 2/2012 | Sprowl | G02B 27/01 345/156 |
| 2012/0120374 A1* | 5/2012 | Keh | G03B 21/28 353/85 |
| 2013/0114053 A1* | 5/2013 | Tatsuno | G03B 21/28 353/99 |

FOREIGN PATENT DOCUMENTS

| JP | 2010-160476 | 7/2010 |
| JP | 2011-002611 | 1/2011 |

* cited by examiner

Primary Examiner — William C Dowling
(74) Attorney, Agent, or Firm — Chip Law Group

(57) ABSTRACT

An image projection method includes: reflecting, by a concave mirror, light having transmitted through one or more lenses after forming an intermediate-focused image of the light; and projecting an image onto a projection plane through reflecting the light reflected by the concave mirror by a plane mirror that has an aspect ratio of 1.9 or more.

17 Claims, 13 Drawing Sheets

IMAGE PROJECTION APPARATUS AND IMAGE PROJECTION METHOD

CROSS REFERENCES TO RELATED APPLICATIONS

The present application claims priority to Japanese Priority Patent Application JP 2013-021705 filed in the Japan Patent Office on Feb. 6, 2013, the entire content of which is hereby incorporated by reference.

BACKGROUND

The present disclosure relates to an image projection apparatus including a projection optical system, and to an image projection method using the image projection apparatus.

A projector (image projection apparatus) has been known, which includes an illumination optical system (illumination unit) using a halogen lamp, a metal halide lamp, etc. as a light source, and a projection optical system including a light modulation device and a projection lens, (for example, see Japanese Unexamined Patent Application Publication No. 2011-2611).

A small (palm-sized) and lightweight portable projector referred to as microprojector is now beginning to be widely used in such a projector field. In such a microprojector, a light emitting diode (LED) is mainly used as a light source of an illumination unit. In recent years, use of a laser draws attention in terms of expansion of a color reproduction range and reduction in power consumption.

On the other hand, there has been proposed an image projection apparatus that includes a short-focus projection lens, and is capable of selecting between projection onto a wall surface (vertical plane) and projection onto a floor face (horizontal plane) by changing a posture of the image projection apparatus (mounting surface for placement of the image projection apparatus), (for example, see Japanese Unexamined Patent Application Publication No. 2010-160476).

SUMMARY

However, recently, further compactification is demanded for such a projector to increase user convenience.

It is desirable to provide an image projection apparatus capable of exhibiting excellent display performance despite a more compact structure thereof, and an image projection method capable of projecting an image having excellent quality without using a large image projection apparatus.

According to an embodiment (1) of the present disclosure, there is provided an image projection apparatus, including a projection optical system including one or more lenses, a concave mirror, and a plane mirror that are provided in order from a light incidence side on which incident light is incident, and configured to project an image using the incident light. The one or more lenses form an intermediate-focused image on a near side of the concave mirror, and the plane mirror has an aspect ratio of 1.9 or more.

According to an embodiment (2) of the present disclosure, there is provided an image projection apparatus, including a projection optical system including one or more lenses, a concave mirror, and a planar optical substrate that are provided in order from a light incidence side on which incident light is incident, and configured to project an image using the incident light. The one or more lenses form an intermediate-focused image on a near side of the concave mirror, and the planar optical substrate is configured to reflect a part of the incident light while allowing the other part of the incident light to transmit therethrough.

According to an embodiment (3) of the present disclosure, there is provided an image projection apparatus, including: a projection optical system including one or more lenses, a concave mirror, and a plane mirror that are provided in order from a light incidence side on which incident light is incident, and configured to project an image using the incident light; and a switching mechanism. The one or more lenses form an intermediate-focused image on a near side of the concave mirror, and the switching mechanism is configured to switch between a first projection mode and a second projection mode while maintaining a posture of the one or more lenses and a posture of the concave mirror, in which the first projection mode disposes the plane mirror on an optical path, and the second projection mode disposes the plane mirror off the optical path.

According to an embodiment (4) of the present disclosure, there is provided an image projection apparatus, including: a projection optical system including one or more lenses, a concave mirror, and a planar optical substrate that are provided in order from a light incidence side on which incident light is incident, and configured to project an image using the incident light. The one or more lenses form an intermediate-focused image on a near side of the concave mirror, the planar optical substrate is configured to reflect a part of the incident light while allowing the other part of the incident light to transmit therethrough, and the light having transmitted through the planar optical substrate is projected onto a second surface intersecting with a first surface.

In the image projection apparatuses according to the above-described respective embodiments (1) to (4) of the disclosure, the projection optical system includes the one or more lenses, the concave mirror, and the plane mirror or the planar optical substrate in order from the light incidence side, making it possible to achieve a compact overall structure.

According to an embodiment (5) of the present disclosure, there is provided an image projection method including: reflecting, by a concave mirror, light having transmitted through one or more lenses after forming an intermediate-focused image of the light; and projecting an image onto a projection plane through reflecting the light reflected by the concave mirror by a plane mirror that has an aspect ratio of 1.9 or more.

According to an embodiment (6) of the present disclosure, there is provided an image projection method including: reflecting, by a concave mirror, light having transmitted through one or more lenses after forming an intermediate-focused image of the light; and projecting an image through reflecting the reflection light reflected by the concave mirror by a plane mirror disposed on a passage of the reflection light and then through applying the light reflected by the plane mirror onto a projection plane, or projecting the image through applying the reflection light reflected by the concave mirror onto a projection plane without disposing the plane mirror on the passage of the reflection light.

In the image projection methods according to the above-described respective embodiments (5) and (6) of the disclosure, the intermediate-focused image of the light having transmitted through the one or more lenses is formed before the light reaches the concave mirror, making it possible to reduce a distance between the one or more lenses and the concave mirror.

According to any of the image projection apparatuses of the above-described respective embodiments (1) to (4) of the disclosure, a more compact structure is achieved without degrading optical performance. In addition, according to any of the image projection methods of the above-described respective embodiments (5) and (6) of the disclosure, an excellent image is projected without using a large image projection apparatus.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, some embodiments of the present disclosure are described in detail with reference to accompanying drawings.

[Configuration of Projector]

Figure 1:
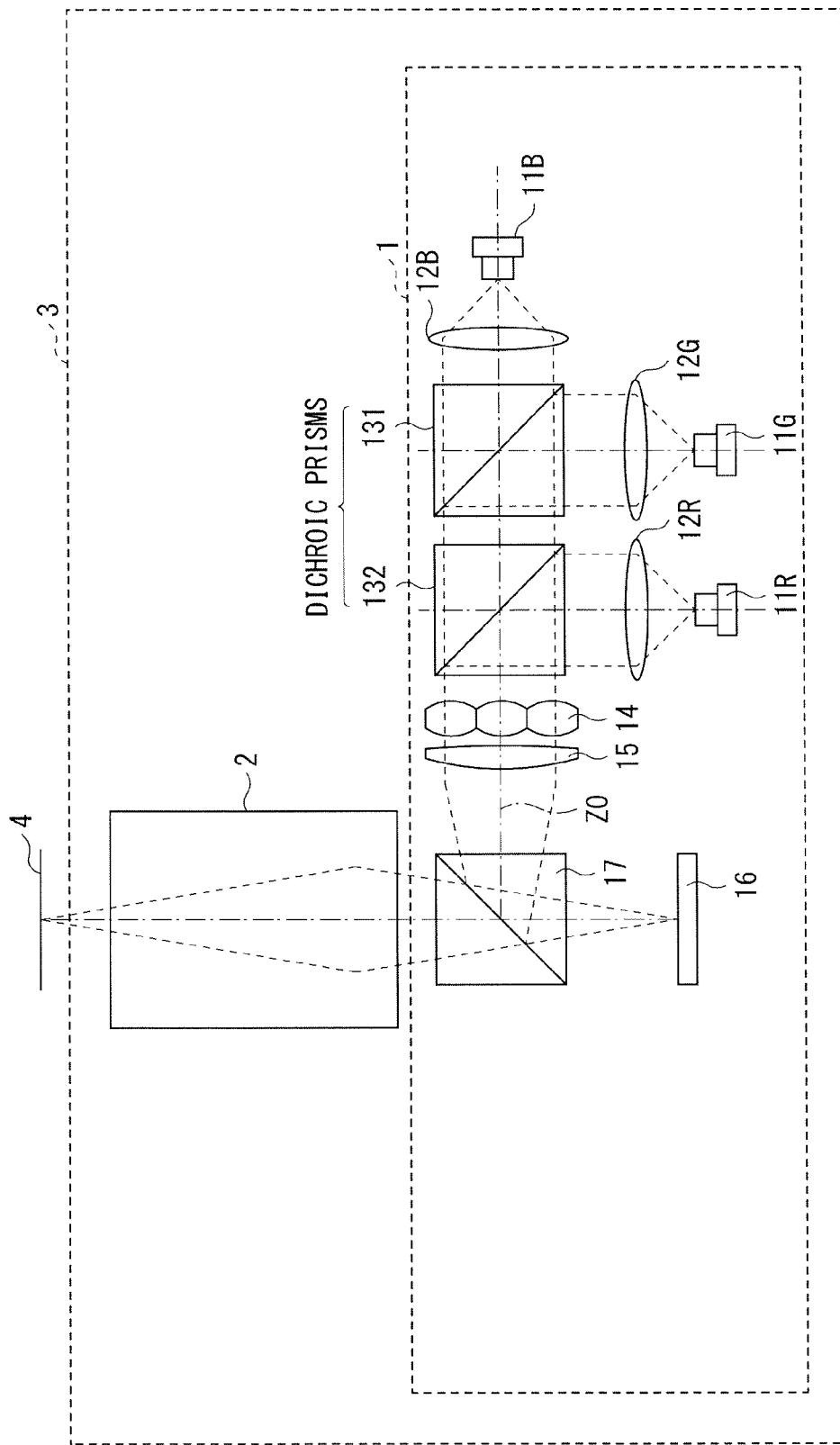
FIG. 1 is a schematic diagram illustrating an exemplary overall configuration of a projector according to one embodiment of the present disclosure.

FIG. 1 illustrates an overall configuration of a projector according to one embodiment of the present disclosure. This projector is a projection-type display unit (an image projection apparatus) that is configured to project an image (image light) onto a screen 4 (plane for projection). The projector includes an illumination unit 1, a projection optical system 2 configured to perform image display using illumination light from the illumination unit 1, and a frame 3 accommodating the illumination optical system 1 and the projection optical system 2. The illumination optical system 1 and the projection optical system 2 are fixed to each other. For example, the projection optical system 2 may be fixed to the frame 3.

(Illumination Unit 1)

The illumination unit 1 includes, within a housing 10, a red laser 11R, a green laser 11G, a blue laser 11B, coupling lenses 12R, 12G, and 12B, dichroic prisms 131 and 132, a fly-eye lens 14, and a condenser lens 15. In the drawing, Z0 indicates an optical axis.

The red laser 11R, the green laser 11G, and the blue laser 11B are three types of laser light sources that emit red laser light, green laser light, and blue laser light, respectively. Such laser light sources configure a light source section. For example, the red laser 11R, the green laser 11G, and the blue laser 11B may each emit pulse light. Specifically, for example, each laser may intermittently emit laser light at a predetermined light emission frequency (in a predetermined light emission cycle). For example, the red laser 11R, the green laser 11G, and the blue laser 11B may each be configured of a semiconductor laser, a solid-state laser, or the like. In the case where each laser is configured of a semiconductor laser, for example, the red laser light may have a wavelength $\lambda r$ of about 600 nm to about 700 nm both inclusive, the green laser light may have a wavelength $\lambda g$ of about 500 nm to about 600 nm both inclusive, and the blue laser light may have a wavelength $\lambda b$ of about 400 nm to about 500 nm both inclusive.

The coupling lens 12G is a lens (coupling lens) that collimates the green laser light emitted from the green laser 11G, and allows the collimated light (i.e., converts the green laser light into parallel light, and allows the parallel light) to be coupled with the dichroic prism 131. Similarly, the coupling lens 12B is a lens (coupling lens) that collimates the blue laser light emitted from the blue laser 11B, and allows the collimated light to be coupled with the dichroic prism 131. The coupling lens 12R is a lens (coupling lens) that collimates the red laser light emitted from the red laser 11R, and allows the collimated light to be coupled with the dichroic prism 132. Although each of the coupling lenses 12R, 12G, and 12B collimates the entering laser light (converts the entering laser light into parallel light) in this case, this is not limitative. The laser light may not be collimated (converted into parallel light) by each of the coupling lenses 12R, 12G, and 12B. However, the laser light may be desirably collimated as described above since a unit configuration is reduced in size thereby.

The dichroic prism 131 is a prism that selectively transmits the blue laser light entering through the coupling lens 12B, while selectively reflecting the green laser light entering through the coupling lens 12G. The dichroic prism 132 is a prism that selectively transmits the blue laser light and the green laser light emitted from the dichroic prism 131, while selectively reflecting the red laser light entering through the coupling lens 12R. Consequently, color composition (optical path composition) is performed on the red laser light, the green laser light, and the blue laser light.

The fly-eye lens 14 is an optical component (integrator) including a plurality of lenses (unit cells) that are two-dimensionally arranged on a substrate, and spatially divides an incident beam into beams corresponding to such arranged lenses, and emits the divided beams. In this configuration, the fly-eye lens 14 is disposed on an optical path between the dichroic prism 132 and the condenser lens 17. The fly-eye lens 14 emits the divided beams in a superimposed manner. This uniformizes light emitted from the fly-eye lens 14 (uniformizes light amount distribution in a plane). In the fly-eye lens 14, in order to efficiently utilize obliquely incident light as illumination light as well, the unit cells (each having a predetermined curvature) may be preferably formed not only on a light incident side of the fly-eye lens 14 but also on a light emitting side thereof.

The condenser lens 15 condenses light emitted from the fly-eye lens 14, and emits the condensed light as illumination light.

The illumination unit 1 further includes a reflective liquid crystal panel 16 as a light modulation device and a polarization beam splitter (PBS) 17.

The PBS 17 is an optical component that selectively transmits a particular type of polarized light (for example, p-polarized light), while selectively reflecting another type of polarized light (for example, s-polarized light). Thus, the illumination light (for example, s-polarized light) from the illumination unit 1 is selectively reflected and enters the reflective liquid crystal panel 16, and image light (for example, p-polarized light) emitted from the reflective liquid crystal panel 16 transmits through the PBS 17 in a selective fashion and enters lenses 23 described later.

An undepicted field lens may be disposed on an optical path between the PBS 17 and the reflective liquid crystal panel 16. The field lens allows the illumination light to telecentrically enter the reflective liquid crystal panel 16, leading to compactification of the illumination unit 1.

The reflective liquid crystal panel 16 is a light modulation device that reflects the illumination light from the illumination unit 1 while modulating the illumination light, based on an image signal supplied from an undepicted display control section, and thus emits image light. In this operation, the reflective liquid crystal panel 16 reflects the illumination light such that a type of polarized light at light incidence becomes different from a type of polarized light at light emission. For example, such a reflective liquid crystal panel 16 may be configured of a liquid crystal device such as liquid crystal on silicon (LCOS).

(Projection Optical System 2)

Figure 2:
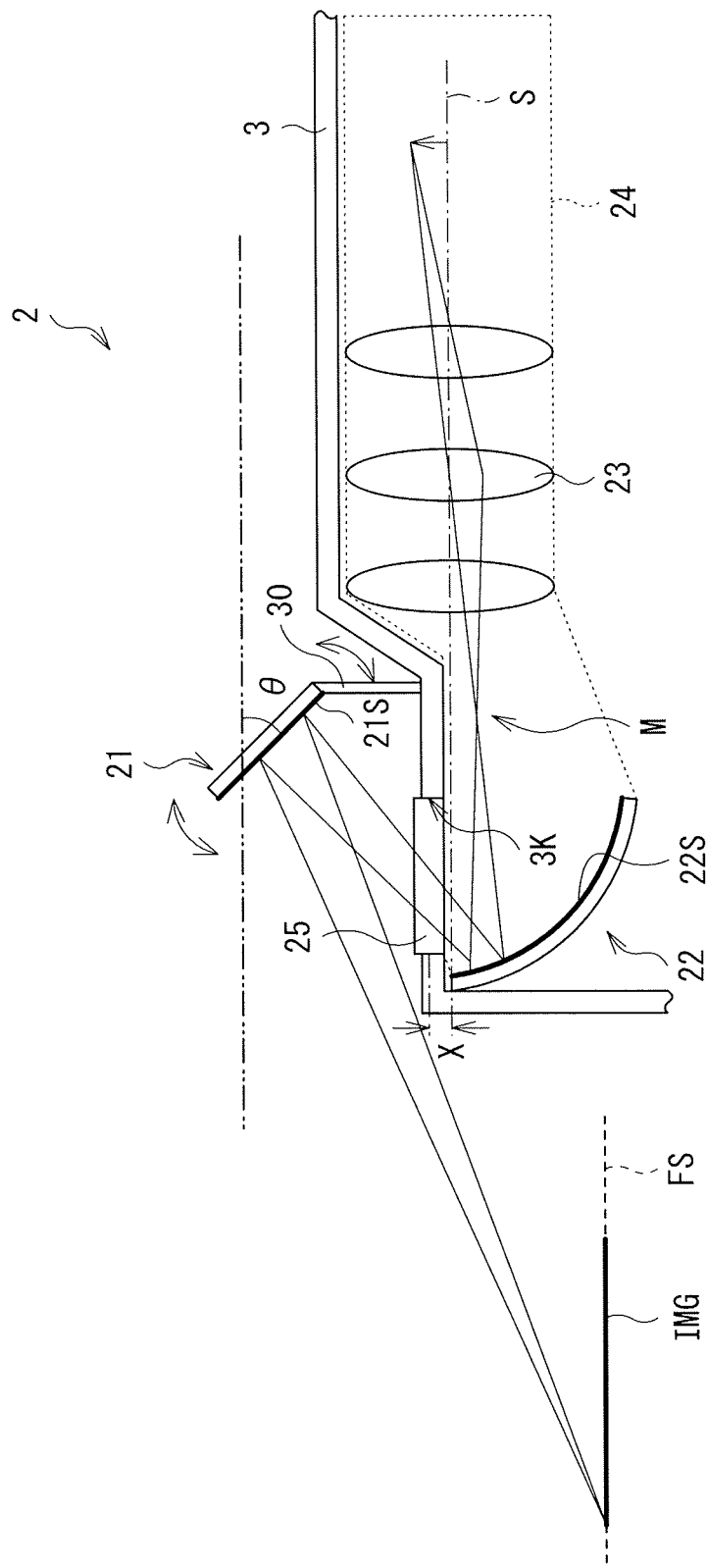
FIG. 2 is an explanatory diagram illustrating a detailed exemplary configuration of a projection optical system illustrated in FIG. 1.

FIG. 2 illustrates a detailed configuration of the projection optical system 2. For example, the projection optical system 2 may include one or more projection lenses 23 (hereinafter simply referred to as "lenses" for convenience in description), a concave mirror 22, and a plane mirror 21 in order from a light incidence side. For example, the projection optical system 2 may be configured to project an image IMG onto a floor face FS using incident light. The lenses 23 are accommodated in a lens barrel 24. The lenses 23 are each a lens that (expansively) projects the illumination light (image light) modulated by the reflective liquid crystal panel 16 onto the screen 4 (FIG. 1). The lenses 23 form an intermediate-focused image M on a near side of the concave mirror 22. A formation position of the intermediate-focused image M may be between the lenses 23 and the concave mirror 22 or within each lens 23 so long as the position is on a near side of the concave mirror 22. The projection optical system 2 further includes a transparent flat plate 25, which may be configured of glass, etc., on an optical path connecting the concave mirror 22 to the plane mirror 21. The projection optical system 2 is accommodated in the frame 3 except the plane mirror 21. The concave mirror 22 may be accommodated in the lens barrel 24 together with the lenses 23. For example, the plane mirror 21 may be supported in the outside of the frame 3 by a support section 30 provided on an outer surface of the frame 3. The frame 3 has an opening 3K on the optical path connecting the concave mirror 22 to the plane mirror 21, and the transparent flat plate 25 is so provided without leaving space as to seal the opening 3K.

The projection optical system 2 projects the image IMG onto the screen 4 provided on the floor face FS as a projection plane defining an angle $\theta$ (for example, $\theta=45°$) with respect to a reflecting surface 21S of the plane mirror 21 as a final surface of the projection optical system 2. The angle $\theta$ of the plane mirror 21 may be variable by an angle adjustment mechanism 20 illustrated in FIG. 3, for example. The angle adjustment mechanism 20 includes a holding substrate 20A holding the reflecting mirror 21, and four adjusting screws 20B provided at four corners of the holding substrate 20A. The holding substrate 20A is fixed to the support section 30 of the frame 3, and an inclination angle of the frame 3 to the support section 30 is varied by rotating each screw 20B. The angle adjustment mechanism 20 facilitates adjustment of inclination of the plane mirror 21 without reflection of a finger, etc. in a projected image.

The incident angle to the reflecting surface 21S of the plane mirror 21 may be over a wide range of 5° to 60° both inclusive, for example; hence, silver (Ag) is most desirable as a constituent material of a reflecting film of the plane mirror 21. This is because silver coating makes it possible to achieve a reflection efficiency of 95% or more over the entire region of visible light in the above-described angle range. Alternatively, the reflecting film of the plane mirror 21 may be configured of a dielectric film. In particular, in the case of using a laser light source, optimization of the reflectance of the dielectric film makes it possible to inexpensively fabricate the reflecting film compared with a case of using silver while exclusively maintaining a reflectance at a desired wavelength. On the other hand, an aluminum film is greatly varied in reflection depending on incident angles of light, and may not be preferable as a constituent material of the reflecting film of the plane mirror 21.

Figure 4A:
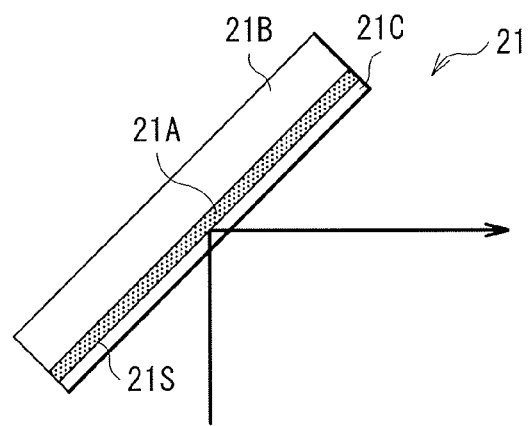
FIG. 4A is an explanatory diagram illustrating a configuration of a plane mirror used in the projection optical system illustrated in FIG. 2.
Figure 4B:
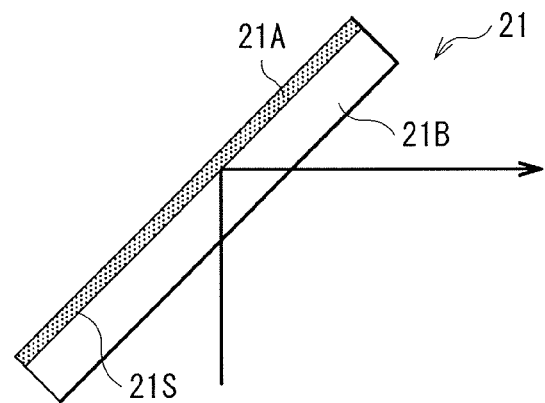
FIG. 4B is an explanatory diagram illustrating another configuration of the plane mirror used in the projection optical system illustrated in FIG. 2.

In the case where the reflecting film of the plane mirror 21 is configured of silver, oxidation of silver may be desirably prevented by the following technique. For example, as illustrated in FIG. 4A, the reflecting film 21A configured of silver may be formed on a substrate 21B, and a protective film 21C may be so provided as to cover the reflecting film 21A. This eliminates contact of the reflecting film 21A to the outside air, thus preventing oxidation of the reflecting film 21A. As a result, a surface in contact with the protective film 21C of the reflecting film 21A is usable as the reflecting surface 21S. Alternatively, as illustrated in FIG. 4B, the reflecting film 21A configured of silver may be formed on the substrate 21B, and a surface in contact with the substrate 21B of the reflecting film 21A may be used as the reflecting surface 21S. In such a case, the substrate 21B may be formed as a transparent member such as glass. Ghosting may be caused depending on thickness 21t of the substrate 21B; hence, the thickness 21t may be made sufficiently large (for example, desirably 3 f or more) to prevent the ghosting, where "f" denotes a focal distance of the projection optical system 2. When "1" is roughly 1.5 mm or less, the total length of the projection optical system 2 is about 150 mm, and width of the plane mirror 21 is 150 mm or less, which is therefore advantageous in achieving compactification. In particular, when "f" is 1.0 mm, the total length of the projection optical system 2 is about 100 mm, and the width of the plane mirror 21 is 100 mm or less, making it possible to achieve further compactification.

Figure 5A:
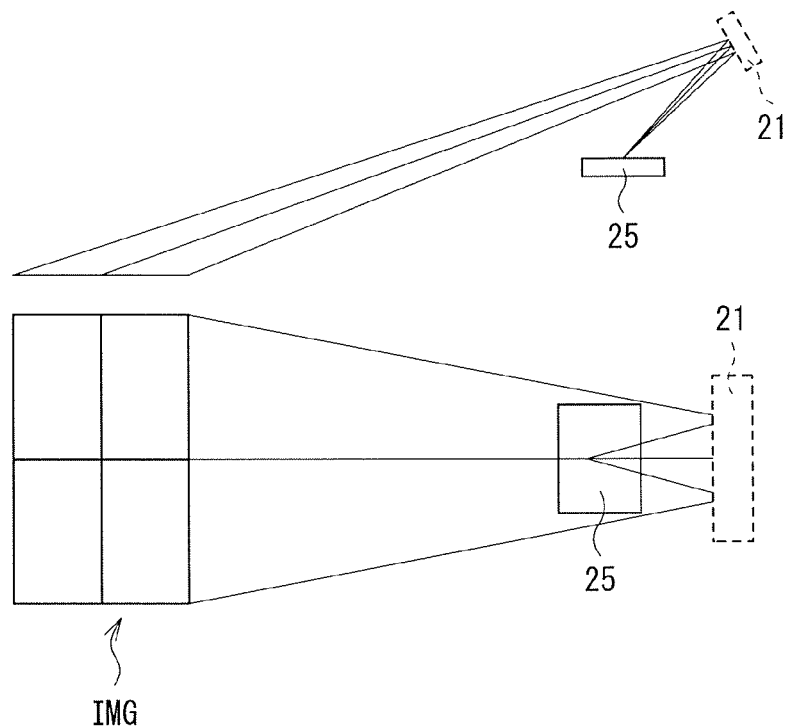
FIG. 5A is a first explanatory diagram for explaining an aspect ratio of a reflecting surface of the plane mirror in the projection optical system illustrated in FIG. 2.
Figure 5B:
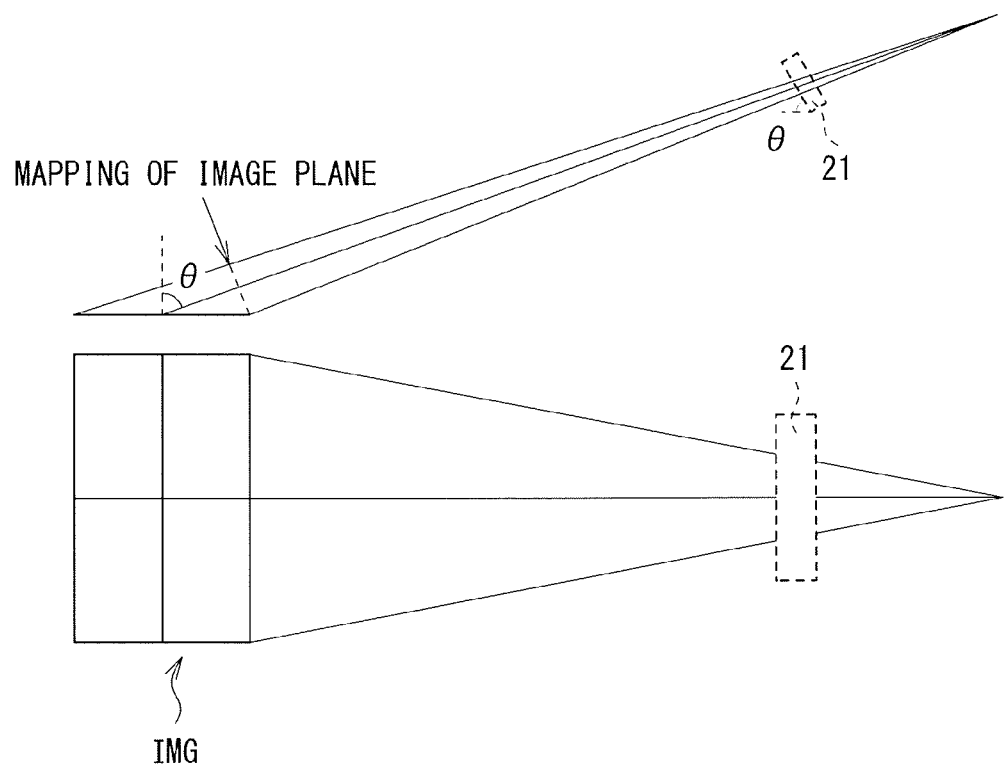
FIG. 5B is a second explanatory diagram for explaining the aspect ratio of the reflecting surface of the plane mirror in the projection optical system illustrated in FIG. 2.

Moreover, an aspect ratio of the reflecting surface 21S of the plane mirror 21 may be desirably 1.9 or more. This is because a more compact structure is achieved thereby. As illustrated in FIGS. 5A and 5B, when a screen aspect ratio of the image IMG projected onto the floor face FS is defined as W0, the aspect ratio W of the reflecting surface 21S of the plane mirror 21 corresponds to mapping of the screen aspect ratio W0 to a surface inclined by the angle θ; hence, the aspect ratio W is represented as follows:

$$W \geq W0/\cos\theta.$$

Here, the plane mirror 21 has no excessive portion, resulting in a more compact structure. A projection angle θ to the screen center may be desirably 45 degrees or more. This is because folding is enabled thereby. For example, in the case of a screen aspect ratio of 16:9, W0 is 1.78, and making W equal to or larger than 2.5 with θ of 45° makes it possible to reduce size of the plane mirror 21. In the case of a screen aspect ratio of 4:3, W0 is 1.33, and W may be desirably made equal to or larger than 1.9. FIG. 5A is an explanatory diagram illustrating a relationship between the transparent flat plate 25, the plane mirror 21, and the image IMG in the projection optical system 2, and FIG. 5B is a development elevation of FIG. 5A.

Figure 6:
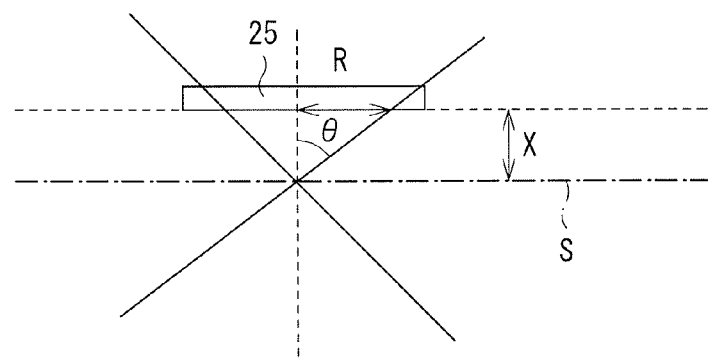
FIG. 6 is an explanatory diagram for explaining a distance of a transparent flat plate from a central axis of lenses in the projection optical system illustrated in FIG. 2.

The lenses 23 are configured as a symmetric optical system disposed on one central axis S. The transparent flat plate 25 preferably extends substantially parallel to the central axis S of the lenses 23. A passing beam centroid position on a light incidence side and a passing beam centroid position on a light emission side of the transparent flat plate 25 may be each desirably disposed at a distance X, which may be 4.6 times or less as long as the focal distance f of the projection optical system 2, from the central axis S of the lenses 23. One reason for this is now described. It is desirable that the transparent flat plate 25 be as small as possible. The transparent flat plate 25 is a window section, which is provided in the opening 3K of the frame 3 and transmits light from the concave mirror 22, and smaller size thereof allows for easier cleaning thereof. Moreover, such reduction in size leads to reduction in weight and reduction in cost such as material cost. For example, as illustrated in FIG. 6, in the case where the lenses 23 located nearer to the incidence side than the concave mirror 22 are disposed on the same central axis S, light from each image height is reflected by the concave mirror 22 and is then temporarily concentrated on the central axis S. In this embodiment, an incidence angle φ on the transparent flat plate 25 may be desirably 60° or less for aberration balance. Consequently, size of the transparent flat plate 25 drastically increases with an increase in distance of the position of the transparent flat plate 25 from the central axis S. When a distance between the central axis S and the transparent flat plate 25 is defined as X, beam radius R increases according to the following relationship:

$$R = X\tan\phi.$$

In view of power and size that enable reduction in aberration, the focal distance f1 of the concave mirror 22 may desirably satisfy the following relationship with the focal distance f of the projection optical system 2:

$$|f1| \leq 4.0 \times |f|$$

The curvature radius Rm of a reflecting surface 22S of the concave mirror 22 is represented as Rm=2×|f1|. If the radius R exceeds 2×|f1|, a plane size of the transparent flat plate 25 exceeds a plane size of the reflecting surface 22S of the concave mirror 22, resulting in an increase in size of the frame 3. Consequently, the following relationship may be desirably satisfied:

$$Rm \geq R,$$

and the following relationships are given:

$$2 \times |f1| \geq X\tan\phi,$$

$$8.0 \times |f| \geq X\tan\phi, \text{ and}$$

$$8.0 \times |f|/\tan\phi \geq X.$$

In the case of φ=60°, the following relationship is necessary to be satisfied:

$$4.6 \times |f| \geq X.$$

For example, when the focal distance f is 1 mm, the following relationship is necessary to be satisfied:

$$4.6 \geq X \text{ [mm]}.$$

Such a portion in the opening 3K is suitable for placement of not only the transparent flat plate 25 but also an optical element such as a wavelength plate or a filter.

Figure 7:
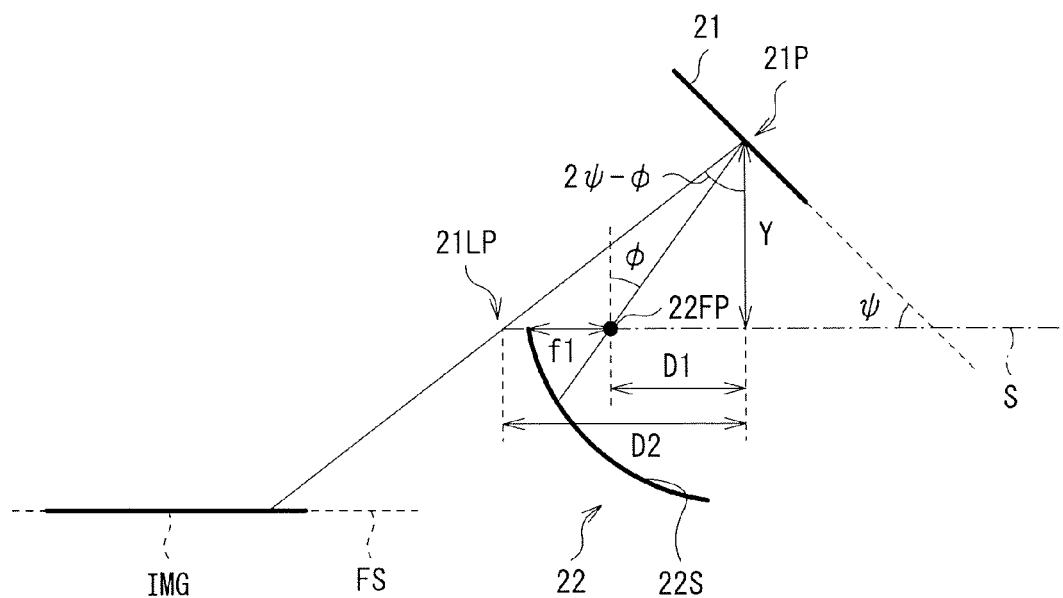
FIG. 7 is an explanatory diagram for explaining a distance of the plane mirror from the central axis of the lenses in the projection optical system illustrated in FIG. 2.

The position of the plane mirror 21 may also be controlled to be within a certain range, thereby allowing compactification of the projection optical system 2. Specifically, in FIG. 7, a distance Y between a beam centroid position 21P of the plane mirror 21 and the central axis S of the lenses 23 may be preferably 1.42 times or more as large as the curvature radius Rm of the concave mirror 22. The height of the plane mirror 21 may be high enough to avoid interference of a beam from the plane mirror 21 with the concave mirror 22, but to be low enough to reduce a size of the plane mirror 21 itself to a certain level. As illustrated in FIG. 7, the plane mirror 21 may be provided at a certain high position in order to avoid vignetting of a beam projected closest to the lenses 23. Specifically, the following relationship may be desirably satisfied:

$$D2 - D1 \geq f1.$$

If the relationship D2−D1≥f1 is not satisfied, a beam reflected by the plane mirror 21 may interfere with the concave mirror 22. Here, D1 is a distance, on the central axis S of the lenses 23, between a focal point 22FP of the concave mirror 22 and the beam centroid position 21P of the plane mirror 21. D2 is a distance, on the central axis S, between the beam centroid position 21P and a transmitted point 21LP of a beam reflected by the plane mirror 21. When an angle of the plane mirror 21 to the central axis S is defined as ψ, the distance Y is represented as follows:

$$Y\{\tan(2\psi-\phi)-\tan(\phi)\} \geq f1, \text{ or}$$

$$Y \geq |f1|/\{\tan(2\psi-\phi)-\tan(\phi)\}.$$

In the case of ψ=45°, a minimum view-angle arrival beam may preferably have φ of 40° or less. Consequently, the following relationship is given:

$$Y \geq 2.84 \times |f1| = 1.42 \times |Rm|.$$

In the case of Rm=−7 mm, the following relationship is necessary to be satisfied:

$$Y \geq 9.9 \text{ mm}$$

The height of the plane mirror 21, i.e., the distance Y may be preferably as low as possible. This is because reduction in thickness of the projection optical system 2 is achieved thereby.

[Position of Plane Glass in Combination with Plane Mirror]

Figure 8:
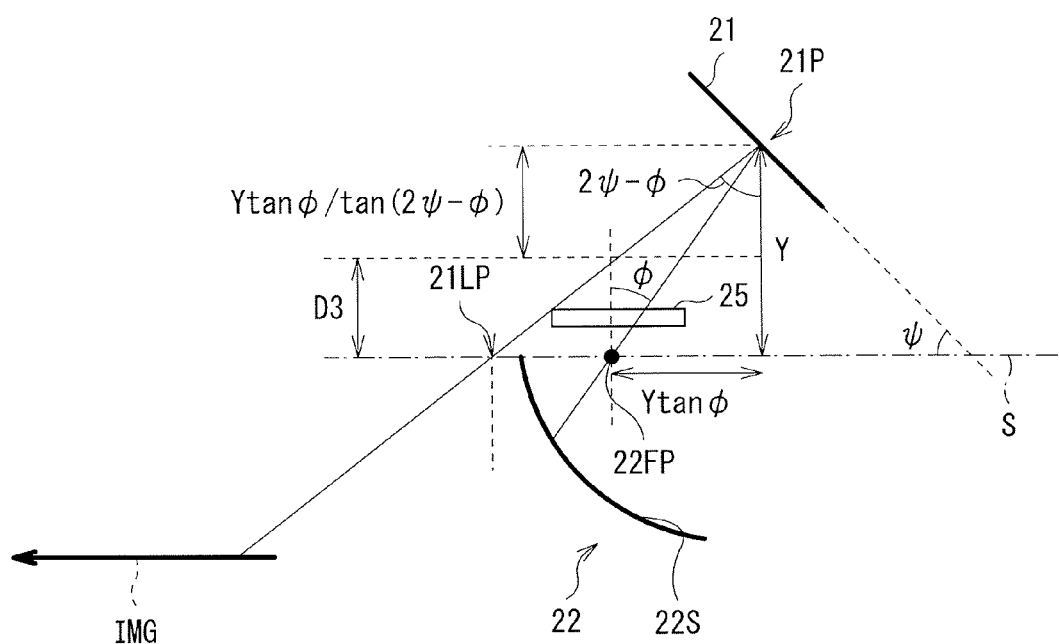
FIG. 8 is an explanatory diagram for explaining a distance of a transparent flat plate from the central axis of lenses in the projection optical system illustrated in FIG. 2.

In particular, in the case of using the transparent flat plate 25, the distance X between the transparent flat plate 25 and the optical axis (central axis S) of the lenses 23 may be preferably 0.3 times or less as long as the distance Y between the beam centroid position 21P of the plane mirror 21 and the central axis S of the lenses 23. This is because, as illustrated in FIG. 8, when the transparent flat plate 25 is located within a span D3 from the focal point 22FP of the concave miller 22 to the nearest reflected beam, any reflected beam is avoided, which is optically advantageous.

Since the following relationship is established $$D3 = Y - Y \tan \phi / \tan(2\psi - \phi),$$

the following relationships are necessary to be satisfied:

$$D3 \geq X, \text{ and}$$

$$Y - Y \tan \phi / \tan(2\psi - \phi) \geq X.$$

In the case of ψ=45°, φ may be desirably 40° or less in lens design. Hence, the following relationship may be more desirably satisfied:

$$0.3 \times Y \geq X.$$

Based on such premise, in the case of Y=9.9 mm, the following relationship is established:

$$2.9 \text{ [mm]} \geq X$$

[Display Operation of Projector]

The projector according to the present embodiment may operate as follows. As illustrated in FIG. 1, first, in the illumination unit 1, the respective colors of laser light (red laser light, green laser light, and blue laser light) emitted from the red laser 11R, the green laser 11G, and the blue laser 11B are collimated by the coupling lenses 12R, 12G, and 12B, respectively, into parallel light. Subsequently, such colors of laser light as the parallel light are subjected to color composition (optical path composition) by the dichroic prisms 131 and 132. The colors of laser light subjected to the optical path composition pass through the fly-eye lens 14 and the condenser lens 15 in this order so as to be formed into illumination light that then enters the PBS 17. In this operation, the fly-eye lens 14 uniformizes the light entering the PBS 17 (uniformizes light amount distribution in a plane).

The illumination light having entered the PBS 17 is selectively reflected by the PBS 17, and enters the reflective liquid crystal panel 16. The reflective liquid crystal panel 16 reflects the illumination light while modulating the illumination light based on an image signal, and thus emits the modulated light as image light. In this operation, since a type of polarized light at light incidence is different from a type of polarized light at light emission, the image light emitted from the reflective liquid crystal panel 16 transmits through the PBS 17 in a selective fashion, and enters the lenses 23. The image light having entered the lenses 23 is (expansively) projected onto the screen 4 by the projection optical system 2 including the lenses 23. Specifically, the image light transmits through the lenses 23 and thus forms the intermediate-focused image M thereof, and is then reflected by the concave mirror 22 so as to be directed to the plane mirror 21. The plane mirror 21 further reflects the image light reflected by the concave mirror 22 to expansively project an image onto the screen 4.

At this time, for example, each of the red laser 11R, the green laser 11G, and the blue laser 11B may perform intermittent light emission operation at a predetermined light emission frequency. As a result, the respective colors of laser light (red laser light, green laser light, and blue laser light) are sequentially emitted in a time-divisional manner. In the reflective liquid crystal panel 16, corresponding colors of laser light are sequentially modulated in a time-divisional manner based on image signals of the respective color components (a red color component, a green color component, and a blue color component). In this way, the projector may perform color image display based on the image signals.

[Operation and Effects of Projector]

According to the projector of this embodiment, a more compact configuration is achieved through such a configuration without degradation of optical performance. For example, in this embodiment, the plane mirror 21 is disposed as a component nearest to the image of the projection optical system 2. The reflecting surface 21S of the plane mirror 21 is provided as a final surface, thereby, while the projection optical system 2 has a typical ultra-short-focus lens configuration and has a large footprint and a small height (see FIG. 2), an image is allowed to be projected onto the floor face FS. In addition, the projection optical system 2 includes the lenses 23, the concave mirror 22, and the plane mirror 21 in order from a light incidence side, and the intermediate-focused image M is formed on a near side of the concave mirror 22, thereby making it possible to reduce size of the plane mirror 21.

Furthermore, the reflecting surface 21S of the plane mirror 21 is made to have an aspect ratio of 1.9 or more, thereby achieving a more compact structure. Moreover, in this embodiment, the lenses 23 may be configured as a symmetric optical system disposed on one central axis S, and the transparent flat plate 25 may extend substantially parallel to the central axis S, and may be disposed at a distance X, which may be 4.6 times or less as long as the focal distance f, from the central axis S. This is advantageous for achieving compactification of the overall structure. However, the transparent flat plate 25 may not be parallel to the central axis S.

[Modification 1]

Figure 3:
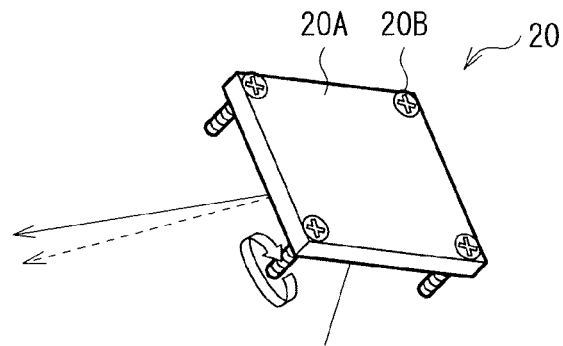
FIG. 3 is a perspective diagram illustrating an angle adjustment mechanism of the projection optical system illustrated in FIG. 2.
Figure 9A:
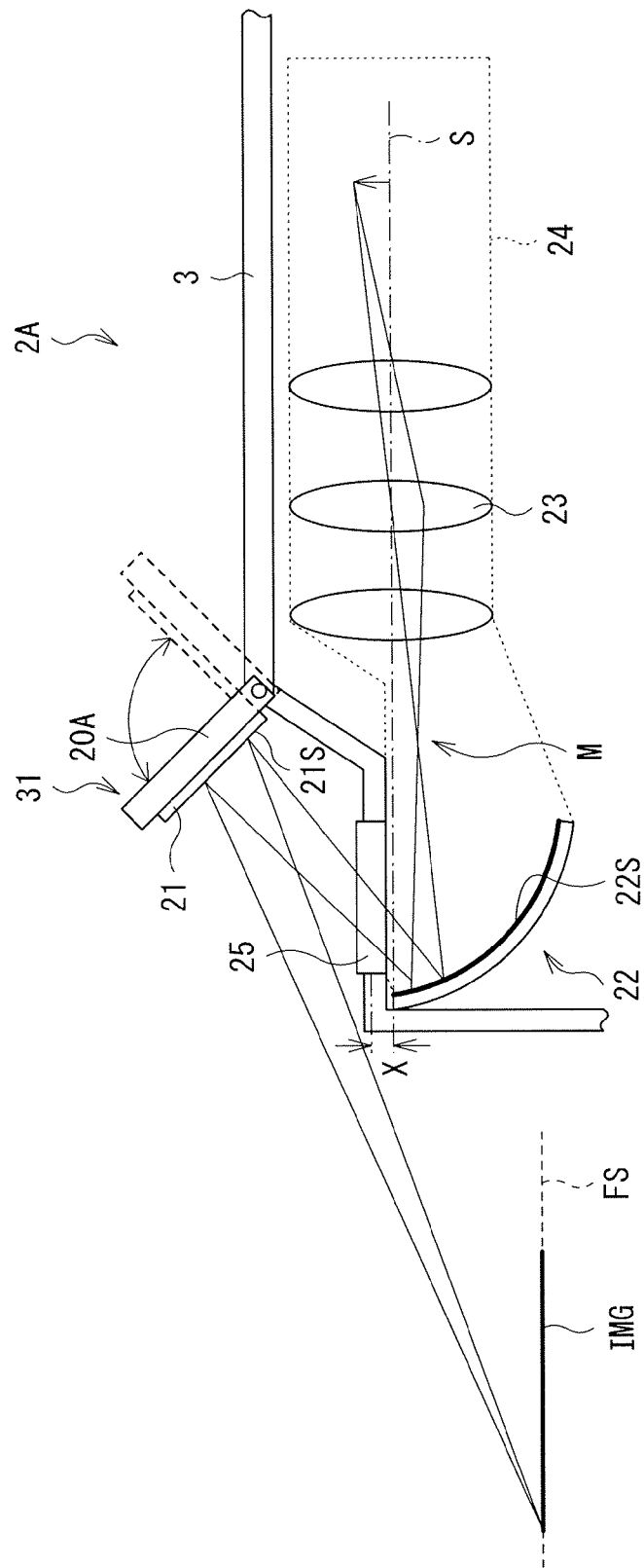
FIG. 9A is an explanatory diagram illustrating a configuration in a first projection mode of a projection optical system according to a first Modification.
Figure 9B:
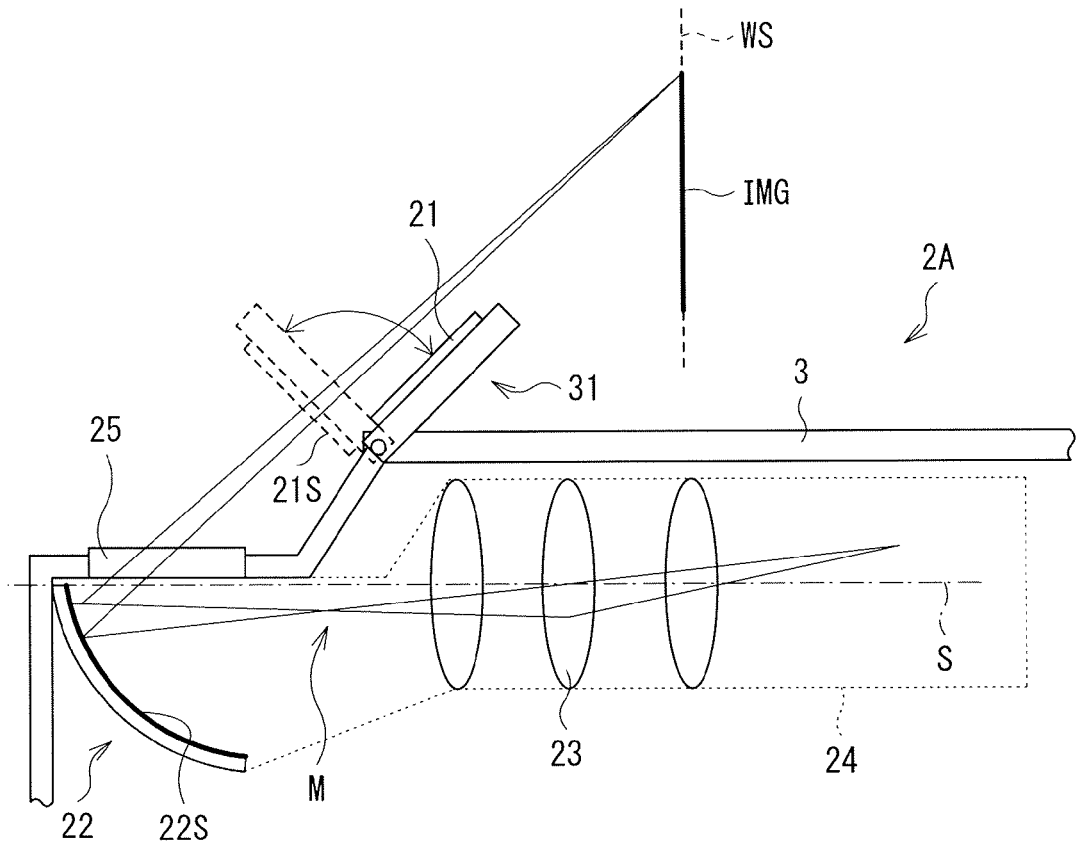
FIG. 9B is an explanatory diagram illustrating a configuration in a second projection mode of the projection optical system according to the first Modification.
Figure 9C:
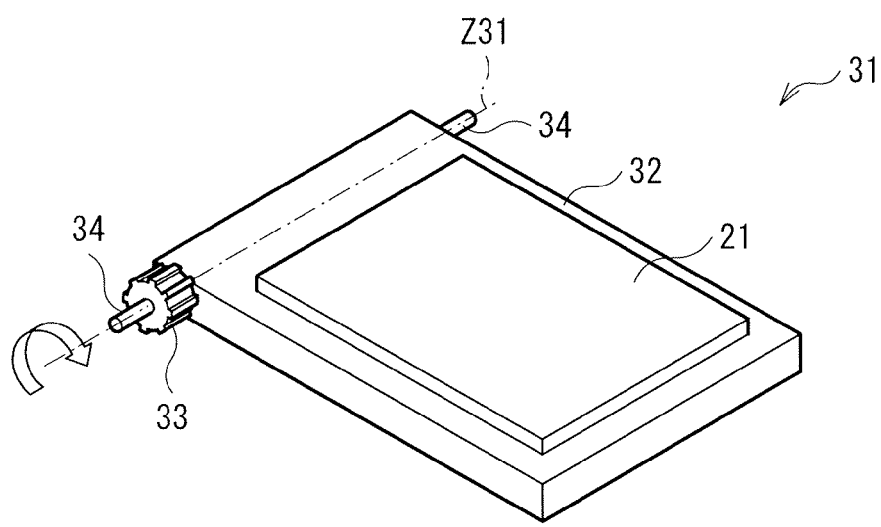
FIG. 9C is an explanatory diagram illustrating a configuration of a switching mechanism of the projection optical system according to the first Modification.

FIGS. 9A and 9B each illustrate a projector including a projection optical system 2A according to a first Modification of the above-described embodiment. In the projection optical system 2A of Modification 1, switching is performed between a first projection mode (FIG. 9A) where the plane mirror 21 is disposed on an optical path (a passage) of image light (reflected light) from the concave mirror 22, and a second projection mode (FIG. 9B) where the plane mirror 21 is off the optical path. Specifically, in the first projection mode, light reflected by the concave mirror 22 is further reflected by the plane mirror 21 disposed on the passage of the light, and the light reflected by the plane mirror 21 is applied onto the projection plane for image projection. On the other hand, in the second projection mode, the light reflected by the concave mirror 22 is applied onto the projection plane for image projection without disposing the plane mirror 21. The projection optical system 2A has a switching mechanism 31 that switches between the first projection mode and the second projection mode while, for example, maintaining postures of the lenses 23 and the concave mirror 22. For example, as illustrated in FIG. 9C, the switching mechanism 31 includes one end of the holding substrate 32 that holds the plane mirror 21, the one end being pivotally attached to the frame 3 about a rotation axis Z31 along one side of the holding substrate 32. In detail, for example, on the rotation axis Z31, a gear 33 and a cylindrical projection 34 may be provided on one end of the holding substrate 32, and another cylindrical projection 34 may be provided on the other end. For example, the gear 33 may be engaged with a gear (not shown) fixed to an axle shaft of a motor, and, for example, the projection 34 may be fitted in a fitting hole (not shown) provided on the frame 3. In the switching mechanism 31, when the gear 33 is driven by, for example, a motor and thus rotates about the rotation axis Z31, the plane mirror 21 pivots together with the holding substrate 32 about the rotation axis Z31. In this operation, in the first projection mode, accuracy of the angle of the plane mirror 21 is important; hence, a stopper (not shown) having high positional accuracy may be preferably provided on the frame 3 so that the plane mirror 21 may pivot until abutting on the stopper. Moreover, for example, an adjustment mechanism as illustrated in FIG. 3 may be further provided in order to finely adjust inclination of the plane mirror 21 with respect to the holding substrate 32. Alternatively, the plane mirror 21 and the holding substrate 32 holding the plane mirror 21 may be provided detachable from the frame 3 in place of providing the switching mechanism 31. In the first projection mode illustrated in FIG. 9A, light reflected by the plane mirror 21 is projected onto the floor face FS as a projection plane along a mounting surface of the frame 3 (for example, a projection plane parallel to the footprint of the frame 3) for projection of the image IMG. On the other hand, in the second projection mode illustrated in FIG. 9B, light from the concave mirror 22 is projected, without traveling through the plane mirror 21, onto the wall surface WS as a projection plane intersecting with the mounting surface of the frame 3 (for example, a projection plane perpendicular to the footprint of the frame 3) for projection of the image IMG.

In this way, in the Modification 1, the plane mirror 21 is removed from the frame 3, or is moved so as to be off the optical path in order to prevent interference of the plane mirror 21 with a beam directed from the concave mirror 22 to the projection plane. Moreover, the projection optical system 2A is configured such that even if a beam directed from the concave mirror 22 to the projection plane is folded by the plane mirror 21, the beam does not interfere with the frame 3, etc. As a result, projection of the image IMG onto both the floor face FS and the wall surface WS is performed in a simple way without changing a posture of a main body. A specific technique of removal or movement of the plane mirror 21 is not limited to the technique described above. Either manual or electric technique may be used. In addition, a possible method includes a technique of escaping the plane mirror 21 in a lateral direction intersecting with the optical axis, and a technique of folding the plane mirror 21. Even if the plane mirror 21 is detached or moved in this way, the dustproof function and the anti-contact function on the concave mirror 22 are still maintained by the transparent flat plate 25.

[Modification 2]

Figure 10:
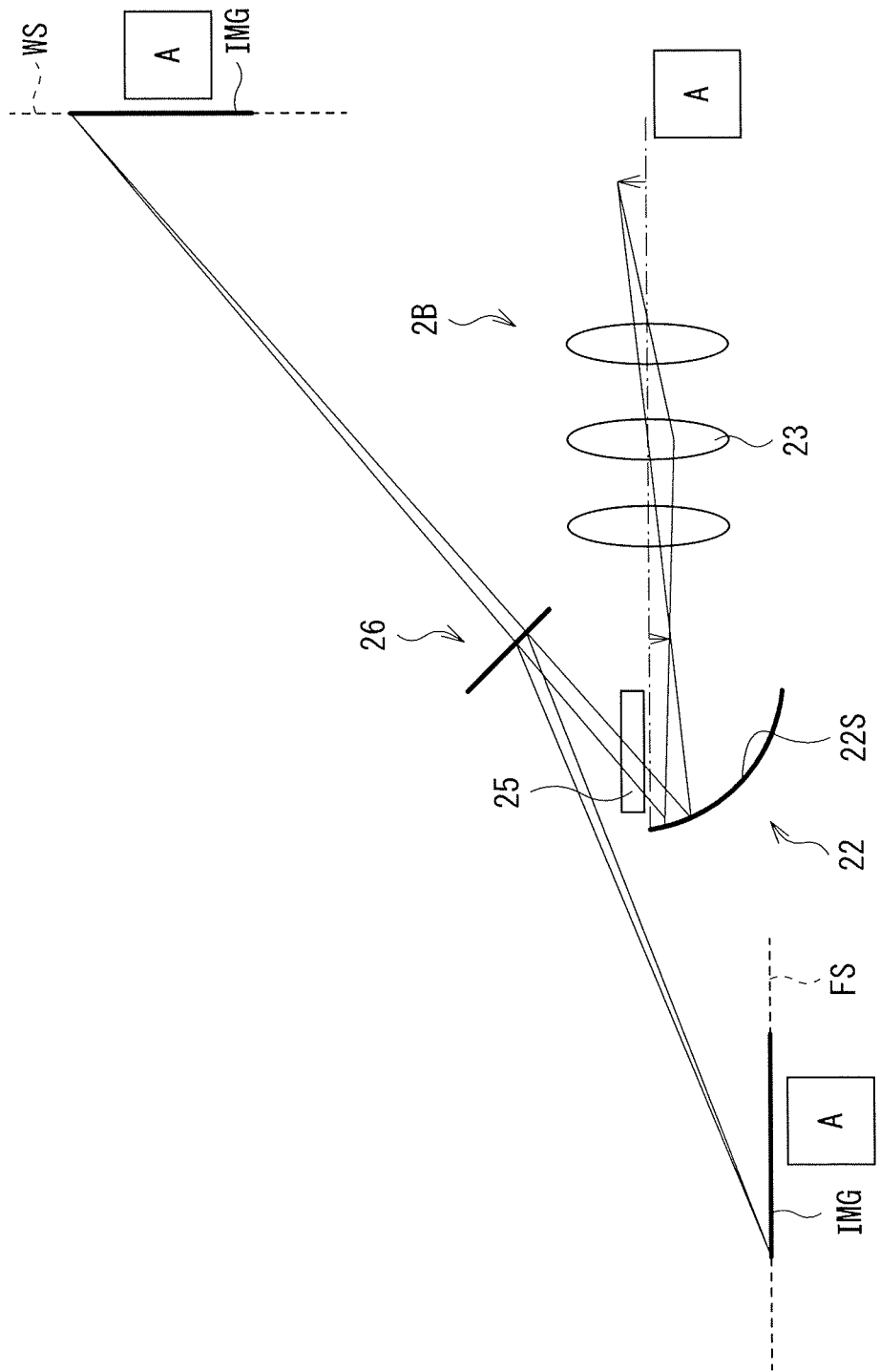
FIG. 10 is an explanatory diagram illustrating a configuration of a projection optical system according to a second Modification.

FIG. 10 illustrates a projector including a projection optical system 2B according to a second Modification of the above-described embodiment. The projection optical system 2B of Modification 2 has a configuration similar to that of the projection optical system 2 of the above-described embodiment except that an unpolarized-light separation film 26 is provided in place of the plane mirror 21 (Modification 2).

The unpolarized-light separation film 26 is a so-called half mirror. For example, the unpolarized-light separation film 26 may be a multilayer film formed of stacked layers each including a dielectric or a metal material. The unpolarized-light separation film 26 has no wavelength selectivity and no polarization selectivity, and transmits laser light having a light quantity approximately half the light quantity of incident laser light, and reflects laser light having the remaining other half light quantity. Alternatively, the unpolarized-light separation film 26 having wavelength selectivity is also usable so long as the unpolarized-light separation film 26 transmits laser light having a light quantity approximately half the light quantity of incident laser light, which has a wavelength within a particular wavelength range to be used, and reflects laser light having the remaining other half light quantity. A ratio of light quantity of laser light subjected to transmission through the unpolarized-light separation film 26 to light quantity of laser light subjected to reflection by the unpolarized-light separation film 26 may be selected as appropriate, i.e., may not be limited to the ratio of 1:1.

In this way, in the Modification 2, a part of incident light is subjected to the transmission and the other part of incident light is subjected to the reflection, which makes it possible to perform projection of the image IMG onto both the floor face FS and the wall surface WS at the same time, leading to improvement in user convenience. For example, a sensing device may be disposed on a floor face side, and simultaneous projection onto the floor face FS and the wall surface WS may be performed using the unpolarized-light separation film 26 which may have a transmittance and a reflectance that are each 50%. For example, in a possible usage, an image projected onto the floor face FS may be used as an image for input, and an image projected onto the wall surface WS may be used as an image for display. For example, a position of a finger on an image projected onto the floor face FS may be sensed by the sensing device, and information processing may be so performed as to move a pointer in a projection screen. This allows a user to perform operation on an image on the relatively accessible floor face while viewing an image on the relatively viewable wall surface WS. In an ultra-short-focus projector, in general, when a finger or the like is placed in the projection plane, a stretched shadow of the finger is shown, which may disturb display of projected information. In the described method, however, information on the wall surface WS is not disturbed even if pointing is performed, and certain screen information is also displayed on the image on the floor face FS, leading to extreme high user-convenience. For displaying certain information on the floor face FS, reflectance Rf of the unpolarized-light separation film 26 may be desirably adjusted as follows:

20%≤Rf.

When the unpolarized-light separation film 26 has wavelength selectivity, different images are allowed to be selectively projected onto the wall surface WS and the floor face FS using such wavelength selectivity.

[Modification 3]

Figure 11:
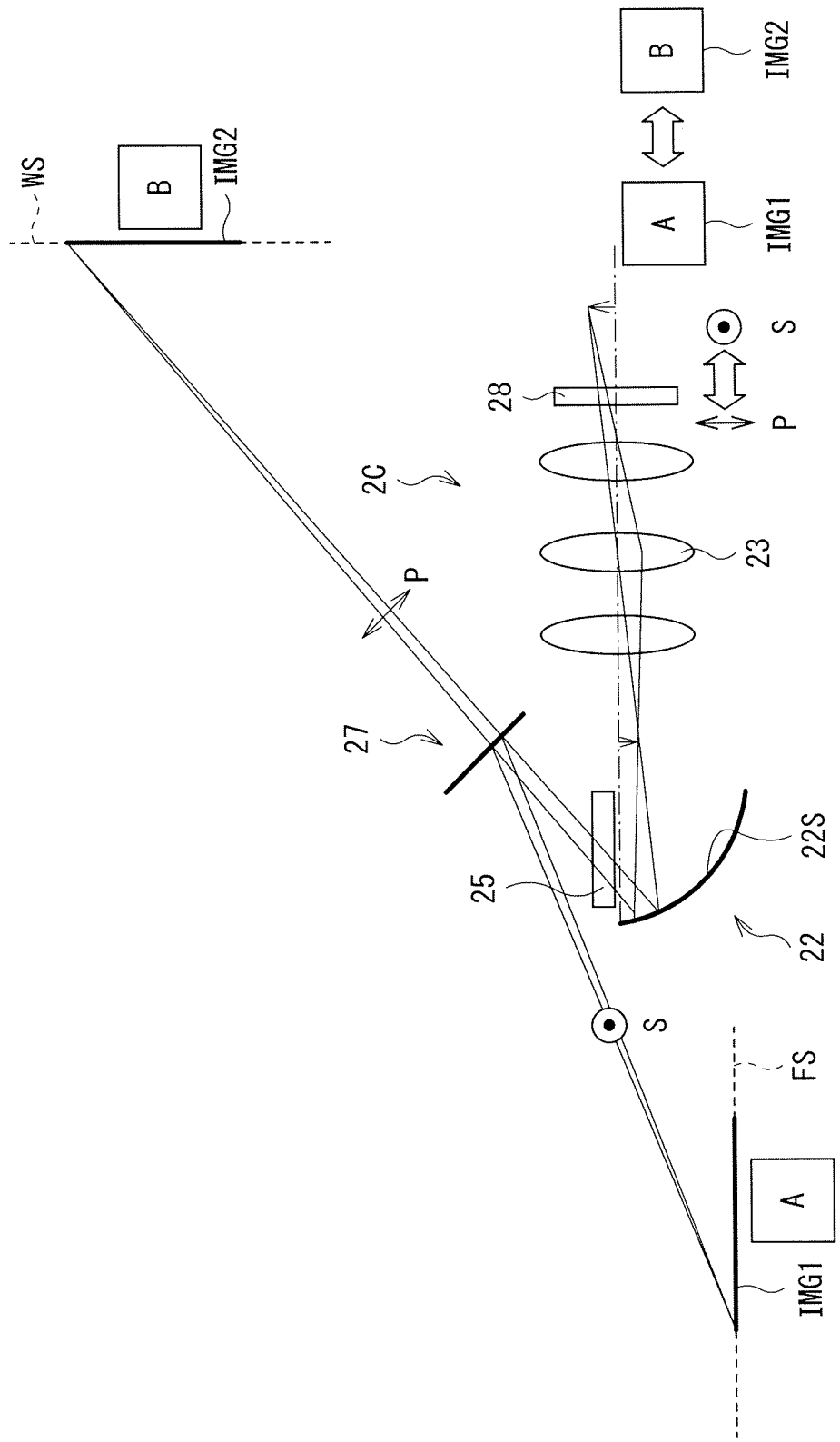
FIG. 11 is an explanatory diagram illustrating a configuration of a projection optical system according to a third Modification.

Furthermore, as with a projection optical system 2C illustrated in FIG. 11, a polarized-light separation film 27 may be provided in place of the unpolarized-light separation film 26 (Modification 3). In the Modification 3, polarization of laser light is switched in a light source, thereby making it possible to selectively project different images to the floor face FS and the wall surface WS. For example, a polarization conversion device 28 may be placed between the reflective liquid crystal panel 16 and the lenses 23, and while two types of images (IMG1 and IMG2) are temporally varied on the reflective liquid crystal panel 16, a polarization direction is temporally varied by the polarization conversion device 28 in synchronization with such temporal image variation. This allows, for example, projection of the image IMG1 onto the floor face FS in the case of S-polarized light, and projection of the image IMG2 onto the wall surface WS in the case of P-polarized light, making it possible to project different images in two directions by one device.

[Modification 4]

Figure 12A:
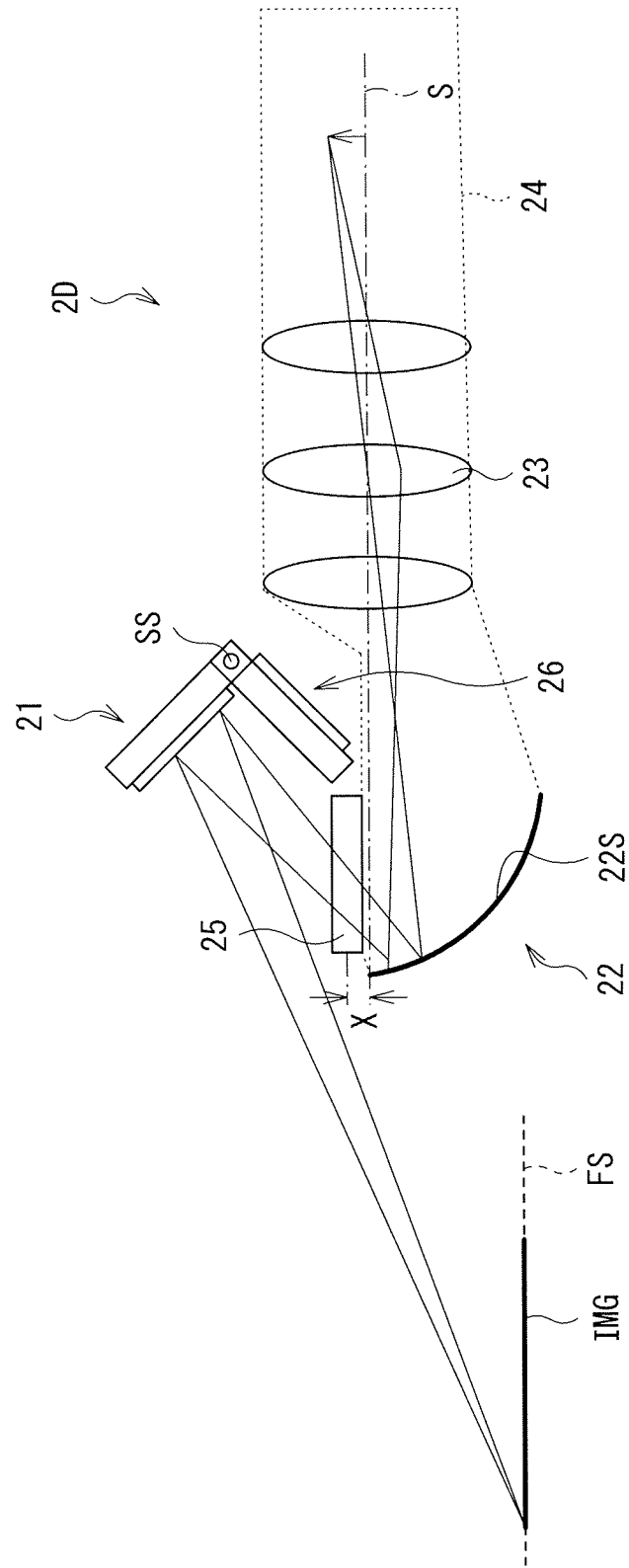
FIG. 12A is an explanatory diagram illustrating a configuration in a first projection mode of a projection optical system according to a fourth Modification.
Figure 12B:
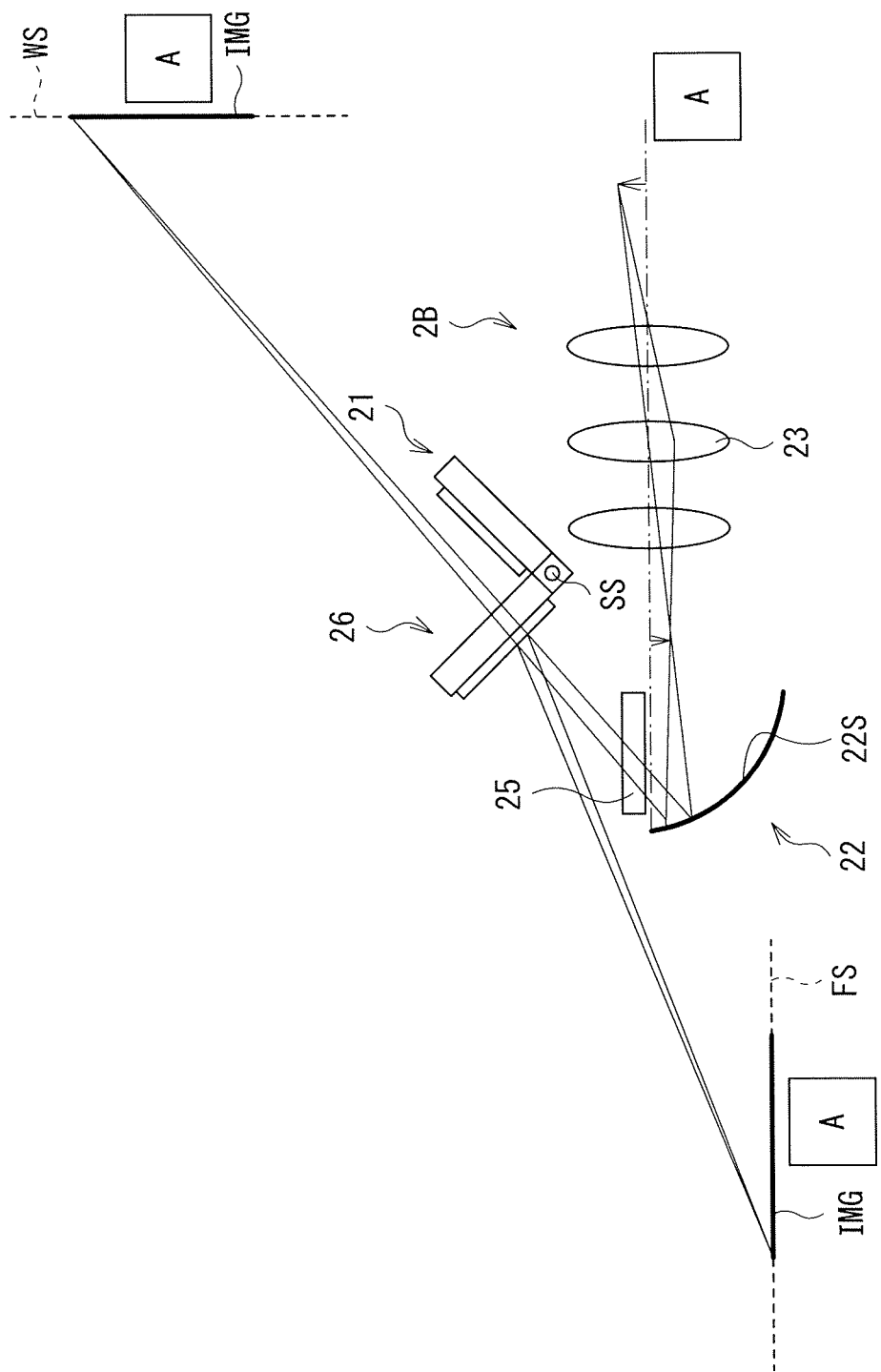
FIG. 12B is an explanatory diagram illustrating a configuration in a third projection mode of the projection optical system according to the fourth Modification.
Figure 12C:
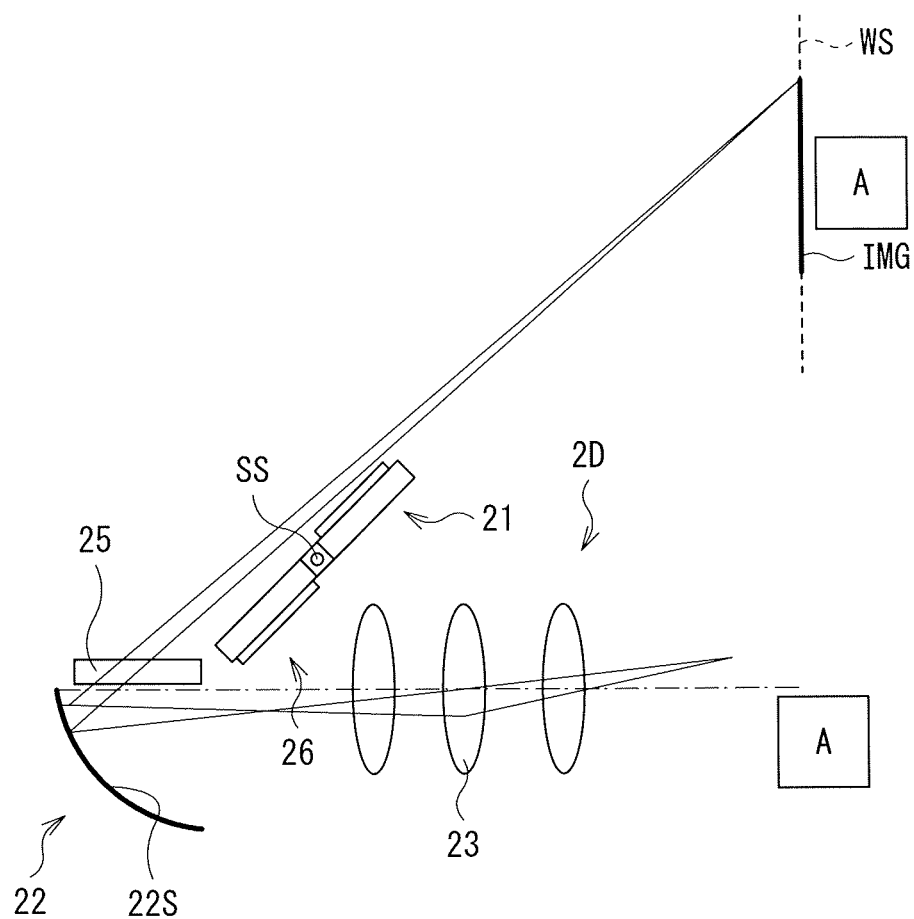
FIG. 12C is an explanatory diagram illustrating a configuration in a second projection mode of the projection optical system according to the fourth Modification.

Furthermore, as with a projection optical system 2D illustrated in FIGS. 12A to 12C, the projection optical system may be configured such that a state where the plane mirror 21 is placed on an optical path (FIG. 12A), a state where the unpolarized-light separation film 26 is placed on the optical path (FIG. 12B), and a state where such components are off the optical path (FIG. 12C) may be switchable from one another. In Modification 4, for example, one end of the plane mirror 21 and one end of the unpolarized-light separation film 26 may be pivotable about the same axis SS.

Although the present application has been described with the example embodiment and the Modifications thereof hereinbefore, the technology is not limited thereto, and various modifications or alterations may be made.

For example, although the above-described embodiment and the Modifications have been described with an exemplary case where a plurality of (red, green, and blue) light sources are each a laser light source, this is not limitative, and another light source (for example, LED, etc.) may be used. Alternatively, a laser light source and another light source (for example, LED, etc.) may be used in combination.

In addition, although the above-described embodiment and the Modifications have been described with an exemplary case where the light modulation device is a reflective liquid crystal device, this is not limitative. Specifically, for example, the light modulation device may be a transmissive liquid crystal device, or may be a light modulation device other than the liquid crystal device (for example, digital micro-mirror device (DMD)).

Moreover, the above-described embodiment and the Modifications have been described with an exemplary case of using three types of light sources emitting light having different wavelengths. However, for example, one light source, two types of light sources, or four or more types of light sources may be used instead of the three types of light sources.

Furthermore, although the above-described embodiment and the Modifications have been described while the components (optical systems) of the illumination unit and the projector are specifically listed, such components may not be fully provided, or other components may be additionally provided. Specifically, for example, dichroic mirrors may be provided in place of the dichroic prisms 131 and 132.

Furthermore, the technology encompasses any possible combination of some or all of the various embodiments described herein and incorporated herein.

It is possible to achieve at least the following configurations from the above-described example embodiments of the disclosure.

(1) An image projection apparatus, including
a projection optical system including one or more lenses, a concave mirror, and a plane mirror that are provided in order from a light incidence side on which incident light is incident, and configured to project an image using the incident light,
wherein the one or more lenses form an intermediate-focused image on a near side of the concave mirror, and
the plane mirror has an aspect ratio of 1.9 or more.

(2) The image projection apparatus according to (1), further including a transparent flat plate on an optical path connecting the concave mirror and the plane mirror.

(3) The image projection apparatus according to (2), wherein
the one or more lenses configure a symmetric optical system disposed on an optical axis, and
a passing beam centroid position on the light incidence side of the transparent flat plate and a passing beam centroid position on a light emission side of the transparent flat plate are each disposed at a distance from the optical axis of the one or more lenses, the distance being 4.6 times or less as long as a focal distance of the projection optical system.

(4) The image projection apparatus according to (3), wherein a distance between a beam centroid position of the plane mirror and the optical axis of the one or more lenses is 1.42 times or more as large as a curvature radius of the concave mirror.

(5) The image projection apparatus according to (4), wherein a distance between the transparent flat plate and the optical axis of the one or more lenses is 0.3 times or less as long as the distance between the beam centroid position of the plane mirror and the optical axis of the one or more lenses.

(6) The image projection apparatus according to any one of (1) to (5), further including an angle adjustment mechanism configured to adjust an angle of the plane mirror.

(7) The image projection apparatus according to any one of (1) to (6), further including a switching mechanism configured to switch between a first projection mode and a second projection mode while maintaining a posture of the one or more lenses and a posture of the concave mirror, the first projection mode disposing the plane mirror on an optical path, and the second projection mode disposing the plane mirror off the optical path.

(8) The image projection apparatus according to (7), further including a housing accommodating the one or more lenses and the concave mirror,
wherein, in the first projection mode, light reflected by the plane mirror is projected onto a plane that is along a mounting surface of the housing, and in the second projection mode, light from the concave mirror is projected onto a plane intersecting with the mounting surface of the housing without traveling through the plane mirror.

(9) The image projection apparatus according to (7) or (8), wherein the image is projected onto a projection plane that forms an angle of about 45 degrees with respect to the plane mirror.

(10) The image projection apparatus according to any one of (1) to (9), further including:
an illumination optical system; and
a light modulation device configured to modulate, based on an image signal, illumination light from the illumination optical system.

(11) An image projection apparatus, including
a projection optical system including one or more lenses, a concave mirror, and a planar optical substrate that are provided in order from a light incidence side on which incident light is incident, and configured to project an image using the incident light,
wherein the one or more lenses form an intermediate-focused image on a near side of the concave mirror, and
the planar optical substrate is configured to reflect a part of the incident light while allowing the other part of the incident light to transmit therethrough.

(12) The image projection apparatus according to (11), wherein the planar optical substrate reflects or allows the incident light to transmit therethrough depending on a wavelength of the incident light, or reflects or allows the incident light to transmit therethrough depending on polarization of the incident light.

(13) An image projection apparatus, including:
a projection optical system including one or more lenses, a concave mirror, and a plane mirror that are provided in order from a light incidence side on which incident light is incident, and configured to project an image using the incident light; and
a switching mechanism,
wherein the one or more lenses form an intermediate-focused image on a near side of the concave mirror, and
the switching mechanism is configured to switch between a first projection mode and a second projection mode while maintaining a posture of the one or more lenses and a posture of the concave mirror, the first projection mode disposing the plane mirror on an optical path, and the second projection mode disposing the plane mirror off the optical path.

(14) The image projection apparatus according to (13), further including a housing accommodating the one or more lenses and the concave mirror,
wherein, in the first projection mode, light reflected by the plane mirror is projected onto a plane that is along a mounting surface of the housing, and in the second projection mode, light from the concave mirror is projected onto a plane that is substantially orthogonal to the mounting surface of the housing without traveling through the plane mirror.

(15) The image projection apparatus according to (14), further including a transparent flat plate,
wherein the housing has an opening on an optical path connecting the concave mirror and the plane mirror, and
the transparent flat plate is provided in the opening without leaving space.

(16) The image projection apparatus according to any one of (13) to (15), further including a planar optical substrate configured to reflect a part of the incident light while allowing the other part of the incident light to transmit therethrough,
wherein the switching mechanism switches between a third projection mode and one of the first and second projection modes, the third projection mode disposing the plane mirror off the optical path and disposing the planar optical substrate on the optical path.

(17) An image projection apparatus, including
a projection optical system including one or more lenses, a concave mirror, and a planar optical substrate that are provided in order from a light incidence side on which incident light is incident, and configured to project an image using the incident light,
wherein the one or more lenses form an intermediate-focused image on a near side of the concave mirror,
the planar optical substrate is configured to reflect a part of the incident light while allowing the other part of the incident light to transmit therethrough, and
the light having transmitted through the planar optical substrate is projected onto a second surface intersecting with a first surface.

(18) An image projection method, including:
reflecting, by a concave mirror, light having transmitted through one or more lenses after forming an intermediate-focused image of the light; and
projecting an image onto a projection plane through reflecting the light reflected by the concave mirror by a plane mirror that has an aspect ratio of 1.9 or more.

(19) An image projection method, including:
reflecting, by a concave mirror, light having transmitted through one or more lenses after forming an intermediate-focused image of the light; and
projecting an image through reflecting the reflection light reflected by the concave mirror by a plane mirror disposed on a passage of the reflection light and then through applying the light reflected by the plane mirror onto a projection plane, or projecting the image through applying the reflection light reflected by the concave mirror onto a projection plane without disposing the plane mirror on the passage of the reflection light.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image projection apparatus, comprising:
a projection optical system including one or more lenses, a concave mirror, and a plane mirror that are provided in order from a light incidence side on which incident light is incident, and configured to project an image using the incident light,
wherein the one or more lenses are configured to form an intermediate-focused image on a near side of the concave mirror, and the plane mirror has an aspect ratio of 1.9 or more; and
a transparent flat plate on an optical path connecting the concave mirror and the plane mirror,
wherein the one or more lenses configure a symmetric optical system disposed on an optical axis, and
wherein a distance, at which each of a passing beam centroid position on the light incidence side of the transparent flat plate and a passing beam centroid position on a light emission side of the transparent flat plate are disposed from the optical axis of the one or more lenses, is based on a focal distance of the projection optical system.

2. The image projection apparatus according to claim 1, wherein
the distance is 4.6 times or less as long as the focal distance of the projection optical system.

17

3. The image projection apparatus according to claim 1, wherein a distance between a beam centroid position of the plane mirror and the optical axis of the one or more lenses is 1.42 times or more as large as a curvature radius of the concave mirror.

4. The image projection apparatus according to claim 1, wherein a distance between the transparent flat plate and the optical axis of the one or more lenses is 0.3 times or less as long as another distance between a beam centroid position of the plane mirror and the optical axis of the one or more lenses.

5. The image projection apparatus according to claim 1, further comprising an angle adjustment mechanism configured to adjust an angle of the plane mirror.

6. The image projection apparatus according to claim 1, further comprising a switching mechanism configured to switch between a first projection mode and a second projection mode while maintaining a posture of the one or more lenses and a posture of the concave mirror, the first projection mode disposing the plane mirror on an optical path, and the second projection mode disposing the plane mirror off the optical path.

7. The image projection apparatus according to claim 6, further comprising a housing configured to accommodate the one or more lenses and the concave mirror, wherein, in the first projection mode, light reflected by the plane mirror is projected onto a plane that is along a mounting surface of the housing, and in the second projection mode, light from the concave mirror is projected onto a plane intersecting with the mounting surface of the housing without traveling through the plane mirror.

8. The image projection apparatus according to claim 6, wherein the image is projected onto a projection plane that forms an angle of about 45 degrees with respect to the plane mirror.

9. The image projection apparatus according to claim 1, further comprising:
an illumination optical system; and
a light modulation device configured to modulate, based on an image signal, illumination light from the illumination optical system.

10. An image projection apparatus, comprising:
a projection optical system including one or more lenses, a concave mirror, and a planar optical substrate that are provided in order from a light incidence side on which incident light is incident, and configured to project an image using the incident light,
wherein the one or more lenses are configured to form an intermediate-focused image on a near side of the concave mirror, and the planar optical substrate is configured to reflect a part of the incident light while allowing the other part of the incident light to transmit therethrough; and
a transparent flat plate on an optical path connecting the concave mirror and the plane mirror,
wherein the one or more lenses configure a symmetric optical system disposed on an optical axis, and
wherein a distance, at which each of a passing beam centroid position on the light incidence side of the transparent flat plate and a passing beam centroid position on a light emission side of the transparent flat plate are disposed from the optical axis of the one or more lenses, is based on a focal distance of the projection optical system.

11. The image projection apparatus according to claim 10, wherein the planar optical substrate is configured to reflect or allow the incident light to transmit therethrough depending on a wavelength of the incident light, or reflect or allow the incident light to transmit therethrough depending on polarization of the incident light.

12. An image projection apparatus, comprising:
a projection optical system including one or more lenses, a concave mirror, and a plane mirror that are provided in order from a light incidence side on which incident light is incident, and configured to project an image using the incident light;
a switching mechanism,
wherein the one or more lenses are configured to form an intermediate-focused image on a near side of the concave mirror, and
wherein the switching mechanism is configured to switch between a first projection mode and a second projection mode while maintaining a posture of the one or more lenses and a posture of the concave mirror, the first projection mode disposing the plane mirror on an optical path, and the second projection mode disposing the plane mirror off the optical path; and
a planar optical substrate configured to reflect a part of the incident light while allowing the other part of the incident light to transmit therethrough,
wherein the switching mechanism is configured to switch between a third projection mode and one of the first and second projection modes, the third projection mode disposing the plane mirror off the optical path and disposing the planar optical substrate on the optical path.

13. The image projection apparatus according to claim 12, further comprising a housing configured to accommodate the one or more lenses and the concave mirror,
wherein, in the first projection mode, light reflected by the plane mirror is projected onto a plane that is along a mounting surface of the housing, and in the second projection mode, light from the concave mirror is projected onto a plane that is substantially orthogonal to the mounting surface of the housing without traveling through the plane mirror.

14. The image projection apparatus according to claim 13, further comprising a transparent flat plate, wherein the housing has an opening on an optical path connecting the concave mirror and the plane mirror, and the transparent flat plate is provided in the opening without leaving space.

15. An image projection apparatus, comprising:
a projection optical system including one or more lenses, a concave mirror, and a planar optical substrate that are provided in order from a light incidence side on which incident light is incident, and configured to project an image using the incident light,
wherein the one or more lenses are configured to form an intermediate-focused image on a near side of the concave mirror, the planar optical substrate is configured to reflect a part of the incident light while allowing the other part of the incident light to transmit therethrough, and the light having transmitted through the planar optical substrate is projected onto a second surface intersecting with a first surface; and
a transparent flat plate on an optical path connecting the concave mirror and the plane mirror,
wherein the one or more lenses configure a symmetric optical system disposed on an optical axis, and
wherein a distance, at which each of a passing beam centroid position on the light incidence side of the transparent flat plate and a passing beam centroid position on a light emission side of the transparent flat plate are disposed from the optical axis of the one or more lenses, is based on a focal distance of the projection optical system.

16. An image projection method, comprising:

reflecting, by a concave mirror, light having transmitted through one or more lenses after forming an intermediate-focused image of the light, wherein the intermediate-focused image is formed by the one or more lenses on a near side of the concave mirror; and projecting, using a projection optical system, an image onto a projection plane through reflecting the light reflected by the concave mirror by a plane mirror that has an aspect ratio of 1.9 or more, wherein the concave mirror and the plane mirror are connected using a transparent flat plate on an optical path, wherein the one or more lenses configure a symmetric optical system disposed on an optical axis, and wherein a distance, at which each of a passing beam centroid position on a light incidence side of the transparent flat plate and a passing beam centroid position on a light emission side of the transparent flat plate are disposed from the optical axis of the one or more lenses, is based on a focal distance of the projection optical system.

17. An image projection method, comprising:

reflecting, by a concave mirror, light having transmitted through one or more lenses after forming an intermediate-focused image of the light, wherein the intermediate-focused image is formed by the one or more lenses on a near side of the concave mirror; and projecting, using a projection optical system, an image through reflecting the reflection light reflected by the concave mirror by a plane mirror disposed on a passage of the reflection light and then through applying the light reflected by the plane mirror onto a projection plane, or projecting the image through applying the reflection light reflected by the concave mirror onto the projection plane without disposing the plane mirror on the passage of the reflection light, wherein the concave mirror and the plane mirror are connected using a transparent flat plate on an optical path, wherein the one or more lenses configure a symmetric optical system disposed on an optical axis, and wherein a distance, at which each of a passing beam centroid position on a light incidence side of the transparent flat plate and a passing beam centroid position on a light emission side of the transparent flat plate are disposed from the optical axis of the one or more lenses, is based on a focal distance of the projection optical system.

* * * * *